3,245,795
COLOR PHOTOGRAPHIC MATERIAL AND PROCESS
Bela Gaspar, Beverly Hills, Calif., assignor to Minnesota Mining and Manufacturing Company, St. Paul, Minn., a corporation of Delaware
No Drawing. Continuation of application Ser. No. 815,242, May 25, 1959. This application June 12, 1962, Ser. No. 200,339
16 Claims. (Cl. 96—55)

This application is a continuation of U.S. application Serial No. 815,242, filed May 25, 1959, now abandoned.

The invention relates to color photography, and is particularly concerned with the production of alkyl azonium dye images in an exposed silver halide emulsion by development of such exposed emulsion with a primary aromatic amino color developing agent in the presence of a color former capable of yielding alkyl azonium dyes with the oxidation products of the color developing agent formed in situ with the silver image.

In the well known method of color forming development, quinonimine, indophenol or azomethine dye images are formed by reaction of the oxidation products of a primary amino developer such as para amino dimethyl aniline, produced during development of an exposed silver halide emulsion, with a color former such as phenols or compounds having a reactive methylene group such as pyrazolones. The reduced silver image is then removed in known manner as by bleaching to leave a pure dye image. However, the dyes so formed have the disadvantages of being relatively unstable to light and to chemical reagents, and tend to fade on storage.

It is known that azonium dyes which can also be produced by color-forming development are more stable than quinonimine and azomethine dyes. U.S. Patent 2,543,338 describes the formation of azine dyes employing a certain class of color-forming compounds for reaction with the oxidation product of a primary aromatic amino developer. Such color forming components are described as aromatic diamines having an amino group in 1-position and an amino group having an unsubstituted hydrogen connected to nitrogen in 3-position.

However, considering the aromatic diamines of the type described in U.S. Patent 2,543,338 and represented by the formula

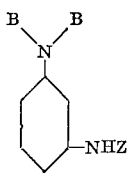

in which B is hydrogen or a hydrocarbon radical, and Z is a grouping more negative than hydrogen and which may be, for example, a phenyl group, if in place of such phenyl group Z is an alkyl group, upon color forming development it has been found that azine dye formation does not occur and a magenta dye is not produced. Instead a cyan dye results, indicating formation of a conventional indamine dye probably by coupling in the 6-position, that is, para to the —NHZ group, with the oxidation product of the primary aromatic amino developer.

In order to obtain an N-alkyl azonium dye image, it has been necessary heretofore to use aromatic triamines as developers, as described in U.S. Patent 2,486,440, which are not only more expensive than the conventional diamine developing agents but are oxidizable and of extremely limited stability, and their practical use is greatly impaired by their tendency toward formation of developer stain in the processed film, as pointed out in U.S. Patent 2,657,139. Further, these triamine developers do not produce the diamino alkyl azonium dyes of the invention hereinafter described.

It is an object of this invention to produce improved azonium, and particularly diamino N-alkyl azonium, dye images by color forming development employing a certain class of color forming components.

A further object of the invention is to provide silver halide emulsions containing color formers capable of coupling with the oxidation products of a primary aromatic amino developing agent, to yield alkyl azonium, and especially diamino N-alkyl azonium, dye images of improved stability.

Yet another object is to provide color developers containing a primary aromatic amino developing agent and a color former capable of coupling with the oxidation products of such developing agent to yield alkyl azonium, and particularly diamino N-alkyl azonium, dye images of improved stability.

Other objects and advantages will be apparent from the following description of my invention.

I have made the surprising discovery that aromatic amines which contain a coupling position para to the amino group, and which contain in the 3-position to such amino group an alkyl amino group wherein the third valence of the nitrogen is occupied by a substituent which reduces the basicity of the secondary amino group in 3-position, and which can be hydrolyzed, is capable of coupling with the oxidation product of a primary aromatic amino color developer during development of the silver halide image, to effect ring closure to produce a diamino N-alkyl azonium, e.g., phenazonium dye image, as will be more fully described below. The substituent connected to the alkyl amino group in 3-position is preferably the residue or radical of an acid, which can be organic or inorganic.

Secondary N-aromatic N-alkyl sulfonamides are known for their great stability. Thus, as disclosed in Journal of the American Chemical Society (1948) 1929, it requires 98% sulfuric acid to hydrolyze a secondary sulfonamide group, that is, one wherein both hydrogens of the amine group are substituted. According to an alternative method as described in Journal of the American Chemical Society, 61, 1989, toluenesulfonmethylamido N-dimethylaniline requires heating for 2 hours at 90° C. in a mixture of 1 part of acetic acid and 2 parts of concentrated sulfuric acid to effect hydrolysis. Hence it was indeed surprising that the secondary N-aromatic N-alkyl sulfonamide color former of the invention should lend itself not only to hydrolysis under mild photographic processing conditions but in addition that it should undergo ring closure readily to form valuable N-alkyl azonium dyes.

A further advantage of my couplers is their extreme ease of coupling, whereby the azine ring formation is instantaneous in most cases without any visible indamine dye formation. Another great technical advantage of my couplers is that they are suitable for use in extremely valuable combinations with many of the conventional type of couplers for producing the cyan and yellow dye images. This is because weaker acids, that is, solutions of higher pH, are sufficient to transform the N-alkyl azonium dye base images which are the initial products of the color development, into their very brilliant, vividly colored magenta azonium salt forms without degrading in many cases the azomethine or indophenol dyes formed in adjacent layers or particles.

Such combinations permit the production of an N-alkyl azonium magenta dye image of very high spectral purity in one layer together with, e.g., cyan indophenol or indoaniline, and yellow azomethine dye images in the other layers, thereby remedying one of the main drawbacks of color developed tricolor images, namely, the very dull blackish or brownish magentas and reds heretofore obtainable with the conventional magenta azomethine dye images; e.g., those produced from conventional pyrazolones. This is a distinct advantage over the N-unsubstituted azine dyes, e.g., those of the above Patent No. 2,543,338, which require stronger acid conditions to transform them into their colored salts.

The color forming compounds which I have found to be suitable for producing N-alkyl azonium dye images for use in color photographic processes according to the invention, either by incorporating such compounds in a photographic emulsion or in a photographic color developer, have the following general structure:

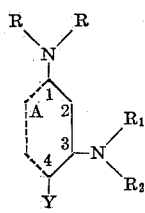

where A is an aromatic radical such as phenyl or naphthyl, R is hydrogen or a hydrocarbon radical, e.g., alkyl, such as methyl, ethyl, butyl, dodecyl and the like, including cycloalkyl such as cyclopentyl or cyclohexyl, and substituted alkyl, such as hydroxyethyl, 3-hydroxypropyl, 2,3-dihydroxypropyl, methoxyethyl, methoxyethoxyethyl, polyglycoloxyethyl, carboxymethyl, carboxyethyl, ethylcarboxymethyl, benzyl, phenylethyl, sulfo-phenylethyl, acetylaminophenylethyl, succinylamino-phenylethyl, furanemethyl and the like, aryl, e.g., phenyl, naphthyl, including substituted aryl such as methylphenyl, ethylphenyl, and the like, or both R's together can form a heterocyclic ring, such as piperidine, morpholine, thiomorpholine, piperazine and the like.

$R_1$ is alkyl or substituted alkyl, such as methyl, ethyl, propyl, butyl, hexyl, octyl, dodecyl, cyclohexyl, 2-hydroxy, 2,3-dihydroxypropyl, carboxymethyl, carboxyethyl, carboxybutyl, carboxydecyl, hydroxethyl-ether, polyglycoloxyethyl, furanemethyl, benzyl, phenylethyl, carboxyphenylethyl, sulfo-phenylethyl, acylaminophenylethyl and the like.

$R_2$ is any substituent which completes or forms an amide with, and reduces the basic character of, the secondary arylalkylamino group in 3-postion, such as the residue of an acid, and which is capable of being eliminated during ring formation by hydrolysis. Such substituent or acid residue should have no free coupling position in order to avoid coupling of this substituent with the oxidized developer to thereby impede ring closure. Substituents of this character which are employed are as follows:

$-SO_2R_3$, $-SO_3M$, $-COR_3$, $-COOR_3$,
$-CONH_2$, $-COCOOR_3$, $-CN$

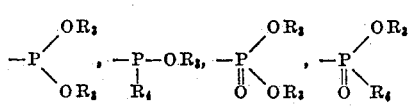

where $R_3$ is hydrogen, alkyl, such as methyl, ethyl, hexyl, dodecyl, octadecyl, or the like, or alkylaryl such as benzyl, phenylethyl, or aryl such as phenyl, naphthyl and the like, cycloalkyl such as cyclopentyl or cyclohexyl, or heterocyclic such as thiophene, piperidine and the like, substituted aryl, such as carboxyphenyl, sulfo-phenyl, acylaminoaryl, e.g., acetylamino-benzene, lauroylaminobenzene, succinylamino - benzene, phthaloylamino - benzene, and the like, amino, alkylamino such as methylamino, and arylamino such as anilino, and where M is a salt-forming cation, e.g., sodium, potassium, magnesium and the like. $R_4$ is alkyl such as methyl, ethyl and the like, or aryl such as phenyl or naphthyl.

More specifically, $R_2$ for example, can be an acid residue like alkylsulfonyl groups such as methanesulfonyl, ethanesulfonyl, butanesulfonyl, dodecanesulfonyl, or arylsulfonyl like benzenesulfonyl, toluenesulfonyl, naphthalenesulfonyl, or solulibilized arylsulfonyl groups such as carboxybenzenesulfonyl or acetylaminobenzenesulfonyl or succinylaminobenzenesulfonyl or dodecenylsuccinylaminobenzenesulfonyl, or an acyl group such as formyl, acetyl, or the higher homologues of acetic acid such as butyroyl, pelargonoyl, lauroyl, or stearoyl or cycloalkyacyl like cyclohexylacetyl, cyclohexypropionoyl and the like, or the residue of any aliphatic or aromatic carboxylic acid which contains a solubilizing group such as sulfobenzoyl, phthaloyl, isophthaloyl, oxalyl, succinyl and the like, or its esters such as methyloxalyl, methylsuccinyl and the like.

Further, $R_1$ and $R_2$ together can be the atoms necessary to complete a heterocyclic ring including the nitrogen atom, such as alicyclic sulfon, or lactam and the like, as represented below:

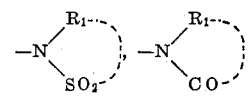

Y can be hydrogen or any group which can be removed during color forming development, such as halogen. In some instances such group may be a carboxy or sulfo group.

The reaction which takes place with my compounds on color development may be illustrated by the following formulae as to the intermediate and final product without attempting to illustrate the reaction mechanism itself, for which various paths and theories can be postulated:

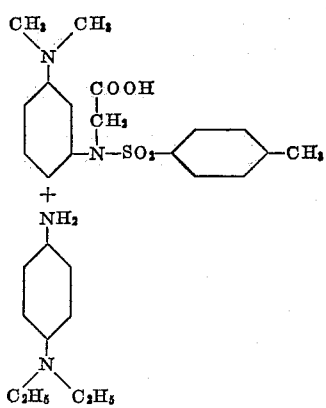

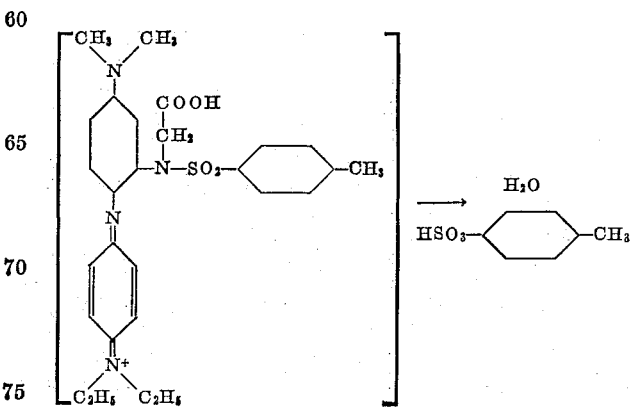

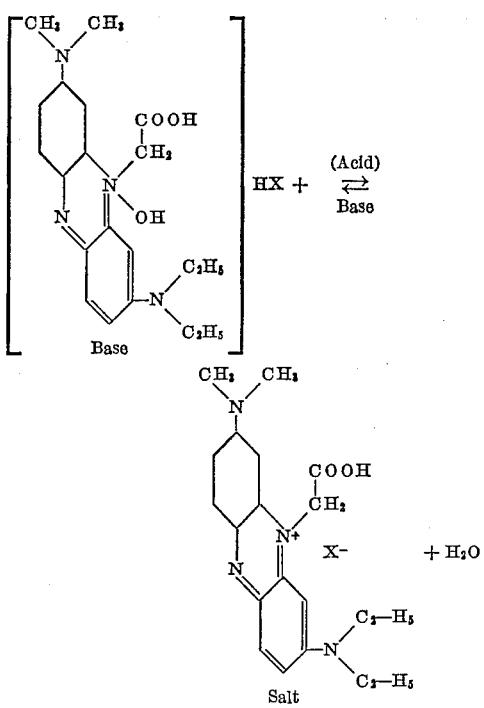

The following working examples show specific embodiment of the invention without the intention of limiting the same. Most of the color couplers of the invention can be incorporated directly into a color developer of the following composition:

|  | Grams |
|---|---|
| p-Diethylamino aniline, or 2-amino-5-diethylamino toluene | Between 2–3 |
| Sodium carbonate | Between 30–60 |
| Potassium bromide | Between 1–2 |
| Sodium sulfite | Between 0.1–0.5 |

Water to make 1 liter.

The composition of the color developer may be varied as is well known in the art. A silver and dye image is formed during development with the above color developer, and the silver image is removed by the usual silver bleach solution such as a neutral potassium ferricyanide followed by a neutral hypo solution. It is understood that the developer can be used as a first developer for an exposed photographic material or it can be used for the second developer in cases where the residual silver halide is exposed for the well known method of producing a reversal (positive) image, or it can be equally used for the redeveloping of a silver halide image which is produced by first developing and fixing an exposed silver halide emulsion in a regular black and white developer, thereafter bleaching the silver image with potassium ferricyanide and potassium bromide solution.

These color developers may be used to great advantage especially for the production of a magenta dye image in the selective reversal process of a multilayer color photographic material, which is now practiced for making multicolor photographic and cinematographic images. In one such process an azomethine dye image is produced to form the magenta and yellow images. The magenta image of the conventional azomethine dye is not only unstable to acid hydrolysis but is of a dull blackish magenta with a very broad absorption spectrum. The diamino N-alkyl azonium dyes obtainable by the present invention produce a superior dye image which is not only stable to hydrolysis, and gives a brilliant vivid magenta and particularly excellent transparent reds and violets, but also is compatible with the conventional cyan and yellow dye images formed in presently used processes.

For the development of a magenta dye image in a selective reversal process employing the color couplers of the invention, a color developer of the above composition is employed to which a small amount of fogging agent such as 1–5 g. ethylene diamine is added.

For use as a color coupler in the above specific developer, 1–5 g. of the color formers of the following Examples 1, 2, 3, 4, 7, 8, 9, 10, 12, 14, 15 or 18, per liter of developer can be utilized.

The color formers described in the following examples can be incorporated alternatively into photographic emulsion. For example, to a liter of iodobromide, chlorobromide or silver chloride photographic emulsion containing 20 g. silver halide per liter, there is added between 0.25 and 5.0 grams of a color former of the following examples, such as Examples 2, 4A, 4B, 4E, 5, 6, 7, 8, 11, 17, 18, 19–22.

The color former can be incorporated in a single emulsion layer of a photographic material or in one of the superimposed emulsion layers thereof, or in emulsion particles which form a discrete portion within the coating or layer of the photographic material, which may also contain a color sensitizer or a filter dye. The exposed color photographic material containing the color former is colored developed in the usual way, as indicated above and as described in certain of the following examples.

The color forming compounds which are incorporated into the photographic emulsion can be made fast to diffusion by attaching to the color former a radical which renders it fast to diffusion by procedures described in the art, such as U.S. Patents 2,778,813, 2,186,849, 2,186,735, 2,280,722, 2,179,234, or as will be apparent from the examples below, and the color former may also contain additional solubilizing groups.

The following are examples of practice of the invention.

*Example 1.—3(p-toluenesulfonyl-carboxymethylamino)-dimethylaniline*

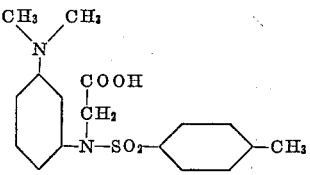

*1–A.—3(ethylcarboxymethyl)-dimethylaniline*

13.6 grams (0.1 mol) 3-amino dimethylaniline was dissolved in 25 cc. alcohol and 12 cc. (0.11 mol) ethylchloroacetate was added; the mixture was refluxed for 5 hours under exclusion of moist air. The mixture was neutralized with 2 normal sodium hydroxide to a weakly acid reaction to litmus or to about pH 7 to Nitrazine paper. The crystalline solid was decanted. The melting point of the crude product was 52–53°, which on recrystallization from dilute alcohol is raised to 54° C.

6.5 grams (0.03 mol) of the 3(ethylcarboxymethylamino) dimethylaniline (1–A) was dissolved in 35 cc. of dry benzene and 6 grams of p-toluenesulfonyl chloride was added and refluxed under exclusion of moisture for 6 hours. After cooling the mixture separates in 2 layers; the upper layer was decanted and to the lower layer 30 cc. normal sodium hydroxide solution and 35 cc. methanol was added and heated under reflux for 2 hours. The mixture was filtered, diluted with water, and sufficient acetic acid was added to make the solution weakly acidic (about pH 5.5 to Nitrazine paper), cooled (with ice) and the solid precipitate was isolated by filtration. Precipitate was dried, M.P. 136° C. Recrystallized from methanol at 145–146°.

Two grams of the above compound was dissolved with the aid of a sodium carbonate solution to which some methanol was added, and added to a solution which contained 2 g. 2-amino diethylamino toluene and 30 g. sodium carbonate per liter. In that solution exposed silver halide material was developed. After removal of the silver image in the usual silver bleach in a ferricyanide bromide solution, a magenta dye image results after acidification with a sodium chloride solution which contains a few drops of acetic acid.

*Example 2.—3(p-toluene sulfonyl methylamino) dimethylaniline*

Prepared according to the method described in the Journal of the Chemical Society (page 1929 (1948)).

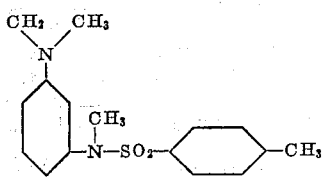

A silver bromide image was redeveloped in a developer of the following composition: 0.25 g. of the compound was dissolved in 6 cc. methanol; to this solution was added 20–30 cc. of a 2% solution of 2-amino-5-diethylamino toluene monohydrochloride and 3 cc. 2 N sodium carbonate solution. Upon redevelopment a strong brown dye image results. After treatment in a potassium ferricyanide bromide solution and fixing with sodium thiosulfate solution in the usual way the brown dye image is changed into a brilliant magenta dye image by immersing the image into a saturated sodium chloride solution containing a few drops of 2 normal acetic acid. The color of the dye is similar to the image obtained in Example 1.

*Example 3.—3(p-toluenesulfonyl carboxy-methylamino) aniline*

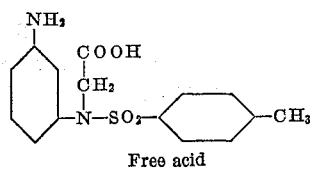
Free acid

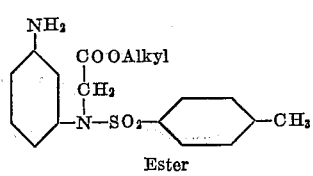
Ester

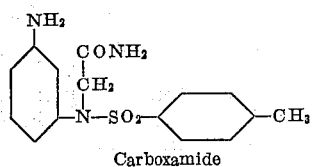
Carboxamide

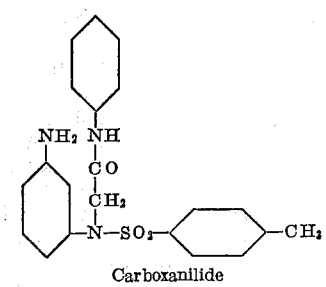
Carboxanilide

Thirty grams 3-N(p-toluenesulfonyl-amino) nitrobenzene and 1 gram sodium iodide was dissolved in 55 cc. 2 N NaOH solution and 100 cc. water under heating. To the solution which was kept at 90° C., 12.5 g. sodium chloroacetate was added during 2.5 hours in 2-gram portions. The reaction of the solution was kept weakly alkaline to phenolphthalein paper. After 2½ hours, 10 cc. additional 2 N NaOH solution and 1.5 g. sodium chloroacetate was added and kept for a further half hour at 90° C. The solution was acidified to pH 4.5, cooled, and the yellowish grey crystalline precipitate filtered. Dried. Yield about 25.5 g. 73%. M.P. of crude 110–120° C. When recrystallized from methanol, M.P. 126–128° C. Recrystallized second time from 35 cc. toluene.

The above nitro compound was dissolved in methanol and hydrogenated over Raney nickel catalyst. The solution concentrated and the crystalline amino compound when recrystallized from dilute alcohol melts at 134–136° C. The above free acid is transformed into its ester, amide or anilide as shown in the above formulae by the conventional methods, and the esters, amides or anilides are used in the emulsion or in the developer. The substance, when present in an exposed silver halide emulsion, or its esters or other derivatives such as carboxamide or carboxanilide, couples to a magenta diamino alkyl phenazonium dye image upon development in a color developer containing a primary aromatic amine such as 4-diethylamino-aniline.

The above compounds are incorporated into the developer the same way as in Examples 1 and 2.

*Example 4–A.—3-(p-toluenesulfonyl carboxy methylamino)-methyl, hexyl aniline*

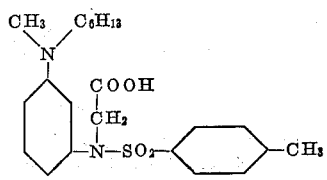

This compound is prepared by the method described in Example 1, from 3-amino methyl hexyl aniline. The starting material is prepared by nitrating methyl hexyl aniline according to the method described in Organic Synthesis, collective volume III, 658 (1955), and reducing the 3-nitro compound with hydrogen over Raney nickel catalyst in the conventional way.

*Example 4–B.—3-(ethyl-carboxy-carboxy methylamino) methyl, hexyl aniline*

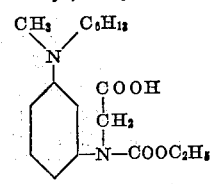

This compound is prepared as in Example 4–A, except the acylation of the 3-amino group is performed with ethyl chlorocarbonate in pyridine.

*Example 4–C.—3-(methylcarboxy carbamylamino) methyl, hexyl aniline*

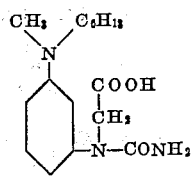

This compound is prepared as in 4–A, except that the acylation of the 3-amine group is performed with potassium cyanate in acetic acid solution.

*Example 4–D.—3-(carboxymethyl carbanilido amino) methyl, hexyl aniline*

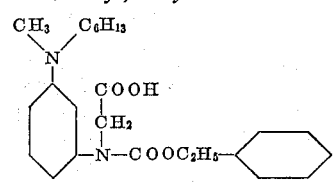

The carbanilido group is attached to the 3-amino group with the aid of phenylisocyanate in toluene before saponification of the ethyl carboxymethyl group. The carboxy methyl ester is saponified as in Example 1 as the final step.

*Example 4-E.—3-(methane-sulfonyl carboxymethyl-amino)-methyl dodecyl aniline*

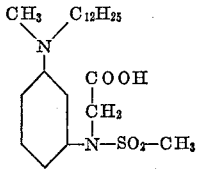

In the compound A of this example, the hexyl radical is replaced by the dodecyl radical, and the p-toluenesulfonyl group is replaced by the methanesulfonyl group. Otherwise the preparation of the compound is closely similar to that of the compound in 4-A. A compound results which is more resistant to diffusion in the photographic material than 4-A.

*Example 5.—3-[(3'-carboxybenzene) sulfonyl dodecylamino] aniline*

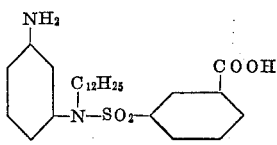

This compound is prepared by alkylating in absolute normal propanol 3-nitro-N sodium-(3' ethyl carboxy benzene sulfonyl) aniline with dodecyl iodide, hydrolyzing the 3' ethyl ester to the acid salt with sodium hydroxide and reducing the nitro group catalytically.

This compound is incorporated in the emulsion and utilized in the same way as Example 4.

*Example 6.—3-(p-toluenesulfonyl carboxy decanyl amino) aniline*

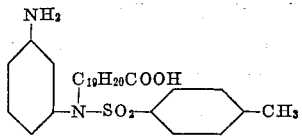

This compound is prepared in an analogous way to Example 3 and utilized in the same way.

*Example 7.—3-(methylbenzene-sulfonylamino)-(4'-succinylamino) diphenylamine*

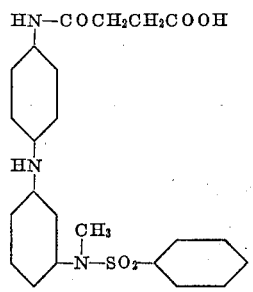

This compound is prepared by reacting 3-(methylbenzenesulfonyl-amino) aniline with 4-chloronitrobenzene in the presence of potassium carbonate in dichlorobenzene, isolating the nitro compound, reducing it and acylating the same with succinic anhydride.

*Example 8.—3-[carboxymethyl-(3'-octanoylamino)-benzenesulfonyl amino] morpholinobenzene*

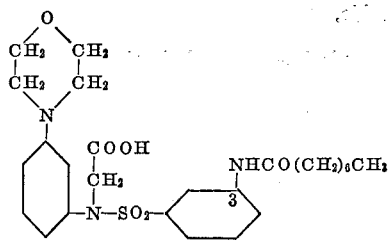

This compound is prepared in an analogous way to Example 1.

*Example 9.—3,(5'-oxo-piperidino)-diethylaniline*

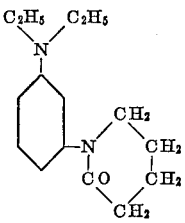

This compound is prepared by alkylating 3-amino diethylaniline with iodo pentanoic ethylester, saponifying the ester with sodium hydroxide in alcohol, isolating the free acid in the same way as Example 1, and performing the ring closure with 3'(4' carboxy butylamino) diethylaniline in acetic anhydride.

*Example 10.—3-(5'-sulfoncyclo tetramethylene amino)-diethylaniline*

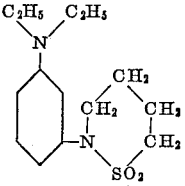

This compound is prepared by alkylating 3-amino diethylaniline with

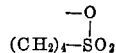

and performing the ring closure with acetic anhydride.

*Example 11.—1-diethylamino-[3-(3'-carboxy) benzenesulfon methylamino] naphthalene*

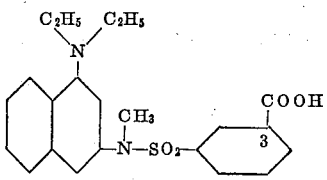

This compound is prepared in an analogous way to Examples 2 and 5.

*4-chloro compounds of 1–10*

All of the above 10 compounds are chlorinated in the 4-position by treating them with one mole sulfuryl chloride in acetic acid solution and utilized in the same way as in the previous examples.

*Example 12.—3-(oxalyl-methylamino dimethyl) aniline*

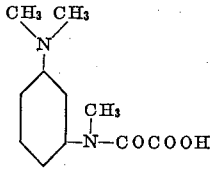

3-methylamino dimethyl aniline is refluxed with anhydrous oxalic acid until it becomes alkali soluble and isolated in the usual way and used as sodium salt or as hydrochloride.

*Example 13.—3-(methylamino ethyloxalyl) dimethyl aniline*

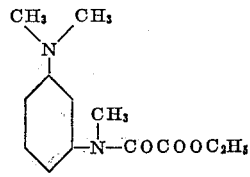

3-methylamino dimethyl aniline is acylated with ethyl oxalylchloride in pyridine or benzene. The compound itself can be incorporated into silver halide emulsion as a colloidal dispersion or dispersed in a high-boiling solvent such as butyloxalate or dibutyl phthalate dispersed through a colloid mill in the well known way to small droplets and mixed with a silver halide emulsion.

*Example 14.—3-(methyl-sodium-sulfamyl) dimethyl aniline*

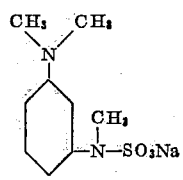

Methylamino dimethyl aniline is reacted by melting with sulfamic acid, then isolated as potassium or sodium salt.

In the above examples the alkyl of the dimethylamino group can be replaced with other alkyls of the chain length of $C_2$ to $C_{18}$ for the purpose of varying solubility and degree of diffusion.

*Example 15.—3-(methyl cyanoamino) dimethylaniline*

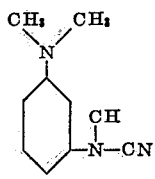

This compound is prepared by reacting 3-methylamino aniline with cyanogen bromide in benzene.

*Example 16.—3-(carboxymethyl-lauroylamino) dimethylaniline.*

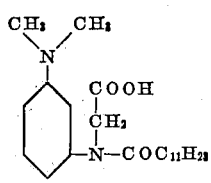

This compound is prepared in a similar way to Example 1, by acylating with lauroyl chloride.

*Example 17.—3-[carboxymethyl-(3'-lauroylamino) benzoylamino] dibutylaniline*

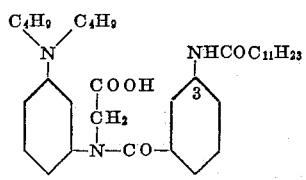

Preparation is analogous to Example 16.

*Example 18.—3-(2',3'-dihydroxypropyl benzenesulfonylamino) dibutylaniline*

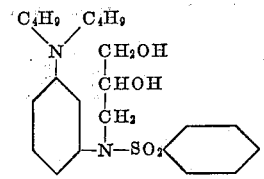

Preparation is analogous to Example 1.

*Example 19.—3-(carboxymethyl-β-nicotinoylamino) dibutylaniline*

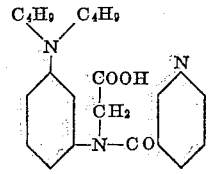

Preparation is analogous to Example 1.

*Example 20.—3-(2'-hydroxyethyl hexahydrobenzoylamino) dibutylaniline*

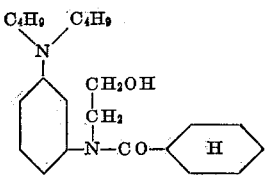

Preparation is analogous to Example 1.

*Example 21.—3-(carboxymethyl thiophene carboxyamino) dimethylaniline*

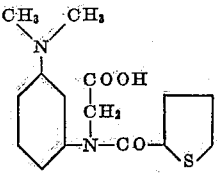

Preparation is analogous to Example 1.

*Example 22–A.—3-(ethylcarboxymethyl (sodium)-phenyl-phosphorylamino) dimethylaniline.*

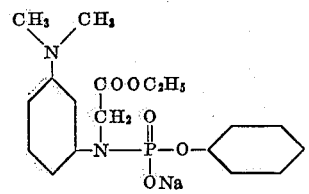

This compound is made by reacting the compound of Example 1–A with dichlorophenyl phosphate in pyridine and neutralizing the reaction product with sodium hydroxide.

*Example 22–B.—3-(ethylcarboxymethyl-anilido-phenyl-phosphorylamino) dimethylaniline*

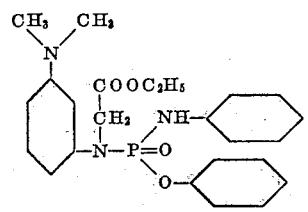

This compound is made by reacting the compound of Example 1–A with anilido chloro phenyl phosphate in benzene.

*Example 22–C.—3-(ethylcarboxymethyl sodium phenyl phosphinylamino) dimethylaniline*

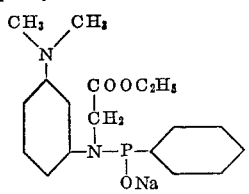

This compound is made by reacting compound of Example 1–A with phenyl phosphorus dichloride in benzene with subsequent neutralization with sodium hydroxide.

*Example 22–$C_1$.—3-(ethylcarboxymethyl sodium dodecenyl phosphinylamine) dimethylaniline*

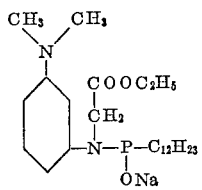

This compound is prepared similarly to above Example 22–C, by using dodecenyl phosphorus dichloride instead of phenyl phosphorus dichloride.

*Example 22–D.—3-(ethylcarboxymethyl sodium phenyl phosphonylamino) dimethylaniline*

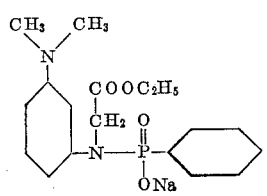

This compound is made by reacting compound of Example 1–A with phenyl phosphorus oxydichloride in benzene with subsequent neutralization with sodium hydroxide.

*Example 22–$D_1$.—3-(ethylcarboxymethylhexadecyl sodium phosphonylamino) dimethylaniline*

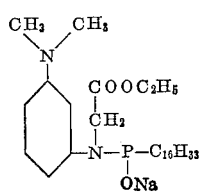

This compound is prepared similarly to above Example 22–D by using hexadecyl phosphorus oxydichloride instead of phenyl phosphorus oxydichloride.

From the foregoing it is seen that I have provided a novel color photographic material and process embodying the application of color formers which readily couple during color forming development to produce improved brilliant diamino N-alkyl azonium magenta dye images.

While particular embodiments of the invention have been described for the purpose of illustration, it should be understood that various modifications and adaptations thereof may be made within the spirit of the invention as set forth in the appended claims.

I claim:

1. The process of producing diamino N-alkyl azonium dye images in a photographic silver halide emulsion, which comprises developing an exposed silver halide emulsion in a primary aromatic amino developer in the presence of a coupler compound capable of coupling with the oxidation products of said developer, said coupler compound having the formula

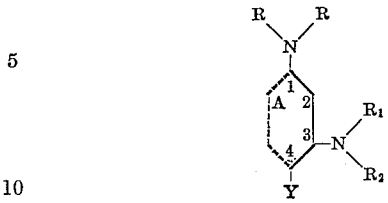

where A represents the atoms necessary to complete an aromatic ring, R is a member selected from the group consisting of hydrogen, alkyl, aryl attached through a carbon atom thereof to the N, and where both R's are alkylene comprising together with the N a heterocyclic ring $R_1$ is a member of the group consisting of alkyl, hydroxyalkyl, carboxyalkyl, alkokyalkyl, furanealkyl and aralkyl groups, $R_2$ is a radical selected from the group consisting of $-SO_2R_3$, $-SO_3M$, $-COR_3$, $-COOR_3$, $-COCOOR_3$, $-CONH_2$, $-CN$,

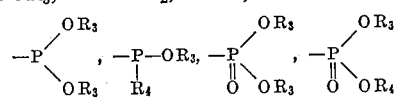

where $R_3$ is a member of the class of hydrogen, alkyl, cycloalkyl, aryl, alkylaryl, amino, arylamino and alkylamino groups, and where $R_1$ and $R_2$ together with the nitrogen in 3-position are capable of forming a heterocyclic ring selected from the group consisting of lactams and sulfones, $R_2$ having no free coupling position, M is a salt-forming cation, $R_4$ is a member of the group consisting of alkyl and aryl groups, and Y is a member of the class consisting of hydrogen, halogen, carboxy and sulfo groups.

2. The process of producing diamino N-alkyl azonium dye images in a photographic silver halide emulsion, which comprises developing an exposed silver halide emulsion in a primary aromatic amino developer in the presence of a coupler compound capable of coupling with the oxidation products of said developer, said coupler compound having the formula

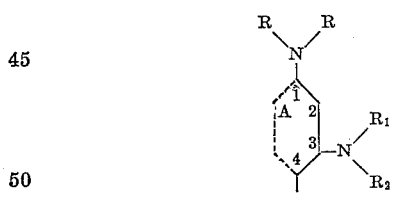

where A represents the atoms necessary to complete an aromatic ring selected from the group consisting of phenyl and naphthyl, R is a member selected from the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, and $R_2$ is a radical selected from the group consisting of $-SO_2R_3$, $-SO_3M$, $-COR_3$, $-COOR_3$, $-COCOOR_3$, $-CONH_2$, $-CN$,

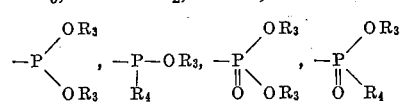

where $R_3$ is a member of the class consisting of hydrogen, alkyl, cycloalkyl, aryl, alkylaryl, amino, arylamino and alkylamino groups, $R_2$ having no free coupling position, M is a salt-forming cation, $R_4$ is a member of the group consisting of alkyl and aryl groups.

3. A photographic silver halide emulsion containing a color forming component capable of producing a diamino N-alkyl azonium dye image upon reaction with the oxidation products of a primary aromatic amino developer, said component being an aromatic compound having the following formula

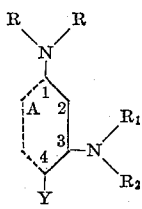

where A represents the atoms necessary to complete an aromatic ring, R is a member selected from the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, $R_2$ is a radical selected from the group consisting of —$SO_2R_3$, —$SO_3M$, —$COR_3$, —$COOR_3$, —$COCOOR_3$, —$CONH_2$, —CN,

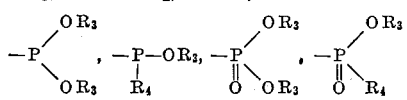

where $R_3$ is a member of the class consisting of hydrogen, alkyl, cycloalkyl, aryl, alkylaryl, amino, arylamino, and alkylamino groups, and where $R_1$ and $R_2$ together with the nitrogen in 3-position are capable of forming a heterocyclic ring selected from the group consisting of lactams and sulfones, $R_2$ having no free coupling position, and M is a salt-forming cation, $R_4$ is a member of the group consisting alkyl and aryl groups, and Y is a member of the class consisting of hydrogen, halogen, carboxy and sulfo groups.

4. A photographic silver halide emulsion containing a color forming component capable of producing a diamino N-alkyl azonium dye image upon reaction with the oxidation products of a primary aromatic amino developer, said component being an aromatic compound having the following formula:

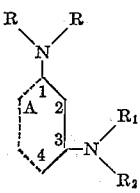

where A represents the atoms necessary to complete an aromatic ring selected from the group consisting of phenyl and naphthyl, R is a member selected from the group consisting of hydrogen, alkyl, aryl attached through a carbon atom thereof to the N, and both R's are alkylene comprising together with the N a heterocyclic ring, $R_1$ is a member of the group consisting of alkyl, hydroxyalkyl, carboxyalkyl, furanealkyl and aralkyl groups, and $R_2$ is a radical seletced from the group consisting of —$SO_2R_3$, —$SO_3M$, —$COR_3$, —$COOR_3$, —$COCOOR_3$, —$CONH_2$, —CN,

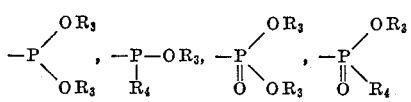

and where $R_3$ is a member of the class consisting of hydrogen, alkyl, cycloalkyl, aryl, alkylaryl, amino, arylamino and alkylamino groups, $R_2$ having no free coupling position, $R_4$ is a member of the group consisting of alkyl and aryl groups, and M is a salt-forming cation.

5. A photogriphic silver halide emulsion as defined in claim 4 wherein $R_1$ is carboxyalkyl.

6. A photographic silver halide emulsion as defined in claim 4, wherein $R_1$ is carboxyalkyl and $R_2$ is said —$SO_2R_3$ group.

7. A photographic silver halide emulsion as defined in claim 4, wherein $R_1$ is carboxymethyl, $R_2$ is toluenesulfonyl, and at least one of said R's is a methyl group.

8. A photographic color forming developer containing a primary aromatic amino developing agent and a coupler compound capable of reacting with the oxidation products of said developing agent to form an N-alkyl azonium dye image, said coupler having the following formula:

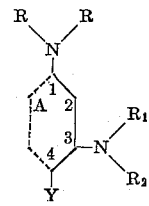

where A represents the atoms necessary to complete an aromatic ring, R is a member selected from the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, $R_2$ is a radical selected from the group consisting of —$SO_2R_3$, —$SO_3M$, —$COR_3$, —$COOR_3$, —$COCOOR_3$, —CONH, —CN,

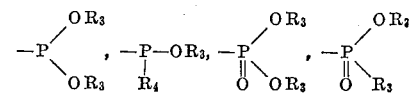

where $R_3$ is a member of the class consisting of hydrogen, alkyl, cycloalkyl, aryl, alkylaryl, amino, arylamino and alkyl-amino groups, and where $R_1$ and $R_2$ together with the nitrogen in 3-position are capable of forming a heterocyclic ring selected from the group consisting of lactams and sulfones, $R_2$ having no free coupling position, and M is a salt-forming cation, $R_4$ is a member of the group consisting of alkyl and aryl groups, and Y is a member of the class consisting of hydrogen, halogen, carboxy and sulfo groups.

9. A photographic developer as defined in claim 8, wherein $R_2$ is said —$SO_2R_3$ group, where $R_3$ is aryl, and $R_1$ is carboxymethyl.

10. The process of producing diamino N-alkyl azonium dye images in a photographic silver halide emulsion which comprises developing an exposed silver halide emulsion in a primary aromatic amino developer in the presence of a coupler compound capable of coupling with the oxidation products of said developer, said coupler compound having the formula

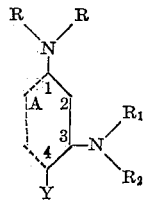

where A represents the atoms necessary to complete an aromatic ring, R is a member of the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, $R_2$ is a radical forming an amide with the attached nitrogen atom, said amide group being devoid of any free coupling position, and Y is a member of the class consisting of hydrogen, halogen, carboxy and sulfo groups.

11. A photographic silver halide emulsion containing a color forming component capable of producing a diamino N-alkyl azonium dye image upon reaction with the oxidation products of a primary aromatic amino developer, said component being an aromatic compound having the formula

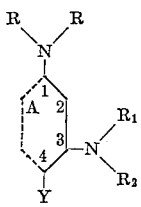

where A represents the atoms necessary to complete an aromatic ring, R is a member of the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, $R_2$ is a radical forming an amide group with the attached nitrogen atom, said amide group being devoid of any free coupling position, and Y is a member of the class consisting of hydrogen, halogen, carboxy and sulfo groups.

12. A photographic color forming developer containing a primary aromatic amino developing agent and a diamino coupler compound capable of reacting with the oxidation products of said developing agent to form an N-alkyl azonium dye image, said diamino compound having the formula

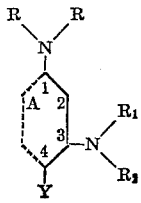

where A represents the atoms necessary to complete an aromatic ring, R is a member of the group consisting of hydrogen, alkyl, aryl attached through a carbon atom thereof to the N, and where both R's are alkylene comprising together with the N a heterocyclic ring, $R_1$ is a member of the group consisting of alkyl, hydroxyalkyl, carboxyalkyl, alkoxyalkyl, furanealkyl and aralkyl groups, $R_2$ is a radical forming an amide group with the attached nitrogen atom, said amide group being devoid of any free coupling position, and Y is a member of the class consisting of hydrogen, halogen, carboxy and sulfo groups.

13. A photographic silver halide emulsion as defined in claim 11, wherein $R_1$ is carboxyalkyl.

14. The process as defined in claim 1, wherein $R_1$ of said coupler compound is carboxyalkyl.

15. A photographic silver halide emulsion as defined in claim 3, wherein $R_1$ is carboxyalkyl.

16. A photographic developer as defined in claim 8, wherein $R_1$ is carboxyalkyl.

References Cited by the Examiner
UNITED STATES PATENTS 2,569,906 10/1951 Starke _____ 96—100
2,652,331 9/1953 Weissberger et al. _____ 96—55

NORMAN G. TORCHIN, *Primary Examiner.*

J. T. BROWN, J. H. RAUBITSCHEK,
*Assistant Examiners.*